United States Patent

Costain et al.

[11] Patent Number: 5,890,966
[45] Date of Patent: *Apr. 6, 1999

[54] QUICK COUPLING CUE STICK

[76] Inventors: Paul Costain, 21 Wellesley Rd.; Gary Fumarola, One Overlook Ave., both of Beverly, Mass. 01915

[*] Notice: The term of this patent shall not extend beyond the expiration date of Pat. No. 5,510,455.

[21] Appl. No.: 847,798

[22] Filed: Apr. 28, 1997

Related U.S. Application Data

[63] Continuation of Ser. No. 466,925, Jun. 6, 1995, abandoned, which is a continuation of Ser. No. 260,588, Jun. 16, 1994, Pat. No. 5,518,455, which is a continuation-in-part of Ser. No. 79,488, Jun. 18, 1993, abandoned.

[51] Int. Cl.$^6$ ................................................. A63D 15/08
[52] U.S. Cl. ....................................................... 473/44
[58] Field of Search ................................... 473/44, 45

[56] References Cited

U.S. PATENT DOCUMENTS

| | | |
|---|---|---|
| 248,681 | 10/1881 | Walter . |
| 682,677 | 9/1901 | Ferchland . |
| 970,172 | 9/1910 | Bloom et al. . |
| 4,231,574 | 11/1980 | Williams ................................. 273/68 |
| 5,518,455 | 5/1996 | Costain et al. ........................... 473/44 |

FOREIGN PATENT DOCUMENTS

| | | |
|---|---|---|
| 8849 | of 1885 | United Kingdom . |
| 2191707 | 12/1987 | United Kingdom . |
| 2219946 | 12/1989 | United Kingdom . |
| 2226251 | 6/1990 | United Kingdom . |
| 2246302 | 1/1992 | United Kingdom . |

OTHER PUBLICATIONS

Drawing depicting a coupling joint which has an external threaded region characterized by a significant number of threads. The internal threaded region is characterized by two threads. Extending from the internal threaded region is a smooth bore for receiving the external threaded region. The coupling joint engages in a significant number of revolutions.

*Primary Examiner*—Mark S. Graham
*Attorney, Agent, or Firm*—Hamilton, Brook, Smith & Reynolds, P.C.

[57] ABSTRACT

A multiple piece cue stick includes multiple stick portions which are coupled together by a sleeve bushing secured to one stick portion and a coupling rod secured to another stick portion. The coupling rod has a elongate shaft which fits within a smooth bore of the sleeve bushing and is coupled to the sleeve bushing by engaging male threads of the coupling rod with female threads of the sleeve bushing.

15 Claims, 5 Drawing Sheets

QUICK COUPLING CUE STICK

RELATED APPLICATIONS

This application is a continuation of application Ser. No. 08/466,925 filed on Jun. 6, 1995, abnadoned, which is a continuation of Ser. No. 08/260,588, filed Jun. 16, 1994, U.S. Pat. No. 5,518,455 which is a continuation-in-part of Ser. No. 08/079,488, filed Jun. 18, 1993, abandoned.

BACKGROUND

Multi-piece cue sticks for playing pool are generally two piece sticks which consist of a lower shaft portion and an upper butt portion which can be assembled together for use or disassembled for transportation. Traditionally, the shaft and the butt are joined together with a two-piece coupling. The coupling usually includes a bushing having a standard female thread secured within the lower shaft portion of the cue stick and a rod having a mating male thread secured within the upper butt portion of the cue stick. The two portions of the cue stick are joined together by screwing the male thread of the rod into the mating female thread of the bushing until the end of the shaft portion of the cue stick contacts the end of the butt portion of the cue stick.

SUMMARY OF THE INVENTION

A problem with this type of coupling is that the two portions of the cue stick may not become concentric with each other when joined together. A non-concentric cue stick is undesirable because a non-concentric cue stick does not transfer energy to a pool ball as efficiently as a concentric stick and therefore, the pool ball is not hit as sharply. Additionally, assembling the cue stick together by screwing the threaded rod into the bushing is time consuming, therefore, making it unsuitable to disassemble the cue stick during a game for using only the shaft portion as a cue stick when there are space constraints or for jumping the cue ball.

Accordingly, there is a need for a multi-piece cue stick in which the various portions of the cue stick can be assembled together so that the pieces are concentric with each other. Furthermore, there is a need for the coupling of the multiple piece cue stick to be quickly engaged and disengaged so that the user can assemble and disassemble the cue stick quickly during a game.

The present invention provides a cue stick which includes a first stick portion coupled to a sleeve. The sleeve has a smooth inner diameter portion and a female coupling region. A second stick portion is coupled to a coupling rod. The coupling rod has a smooth, elongate tip which has a close fit with the smooth inner diameter of the sleeve and a male coupling region which engages the female coupling region of the sleeve for coupling the coupling rod to the sleeve.

In preferred embodiments, the female coupling region of the sleeve is an internal threaded region and the male coupling region of the coupling rod is a first external threaded region. The sleeve has an external threaded region for coupling the sleeve to the first stick portion. The coupling rod has a second external threaded region for coupling the coupling rod to the second stick portion.

In one preferred embodiment, the internal threaded region of the sleeve and the first external threaded region of the coupling rod are acme-type threads which are capable of being coupled together by twisting the sleeve and the coupling rod relative to each other.

The present invention provides a multi-piece cue stick which can be rapidly assembled and disassembled by twisting the various pieces relative to each other in one revolution or less. Additionally, the two pieces are joined together concentric with each other which enables the pieces to transfer energy more efficiently, thereby, allowing the user to hit a pool ball more sharply. Furthermore, the quick assembly and disassembly feature of the present invention cue stick allows cue sticks of two or more pieces to be assembled and disassembled during a game.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
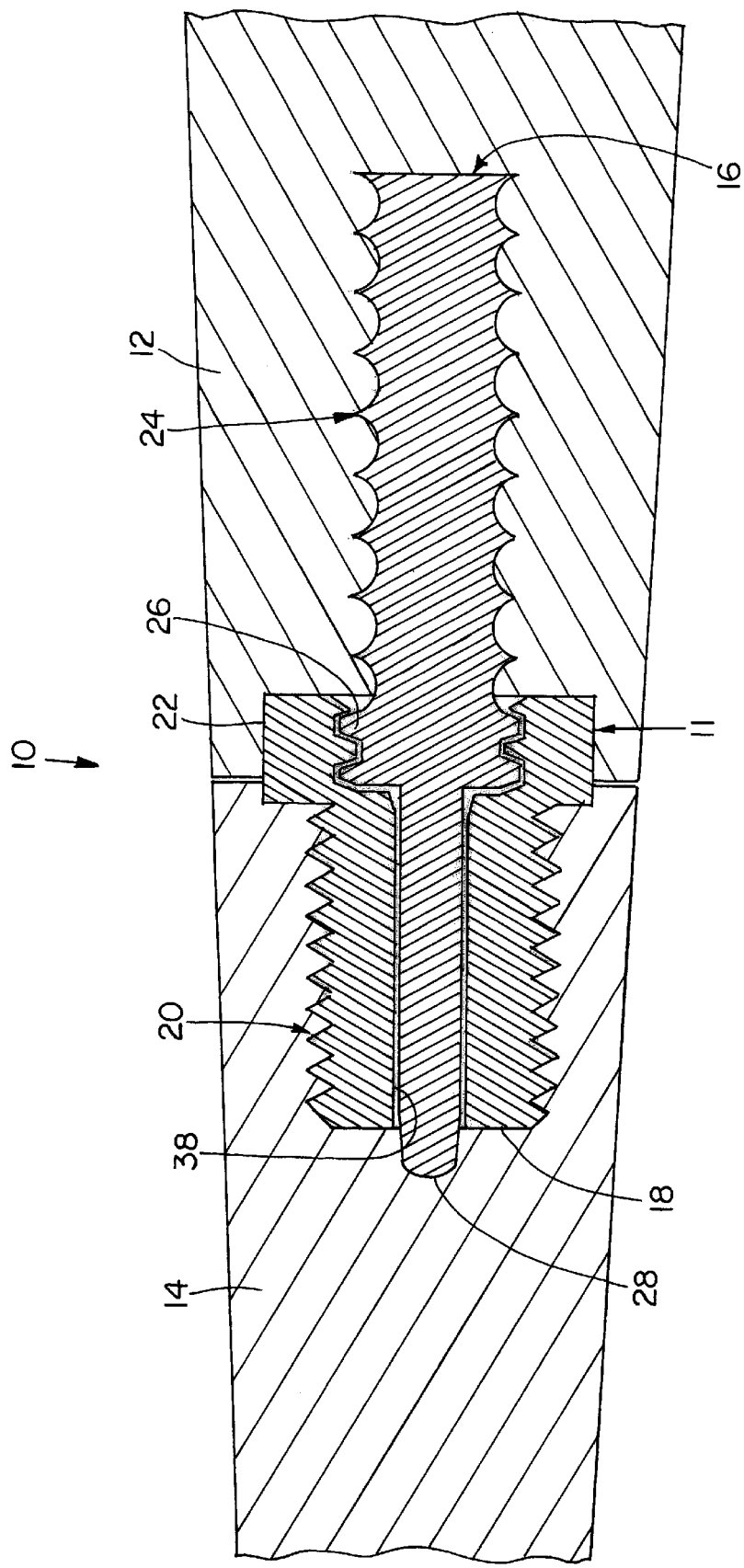
FIG. 1 is a sectional view of the present invention cue stick at the region where two portions of the cue stick are coupled together.
Figure 2:
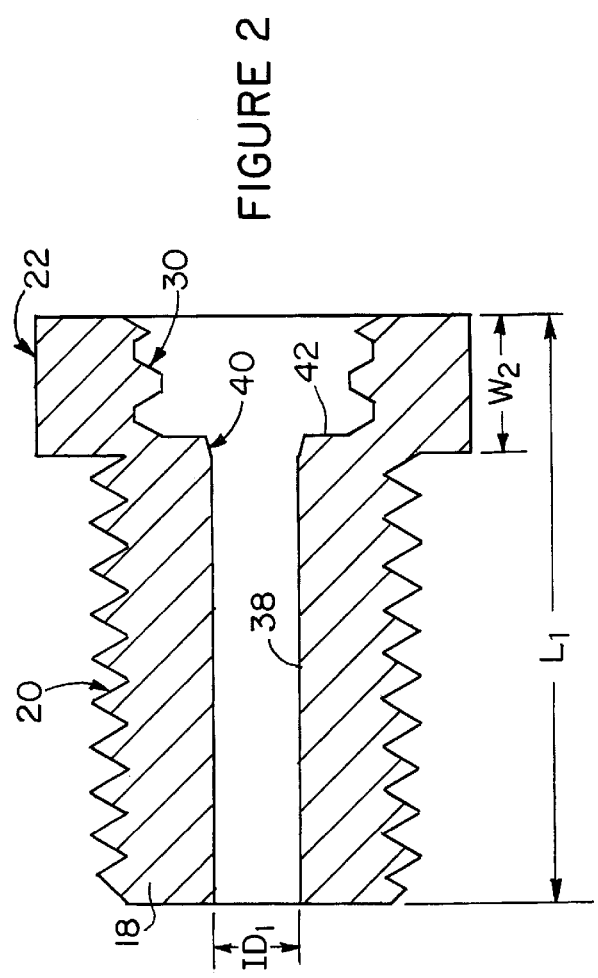
FIG. 2 is a sectional view of the sleeve bushing.
Figure 3:
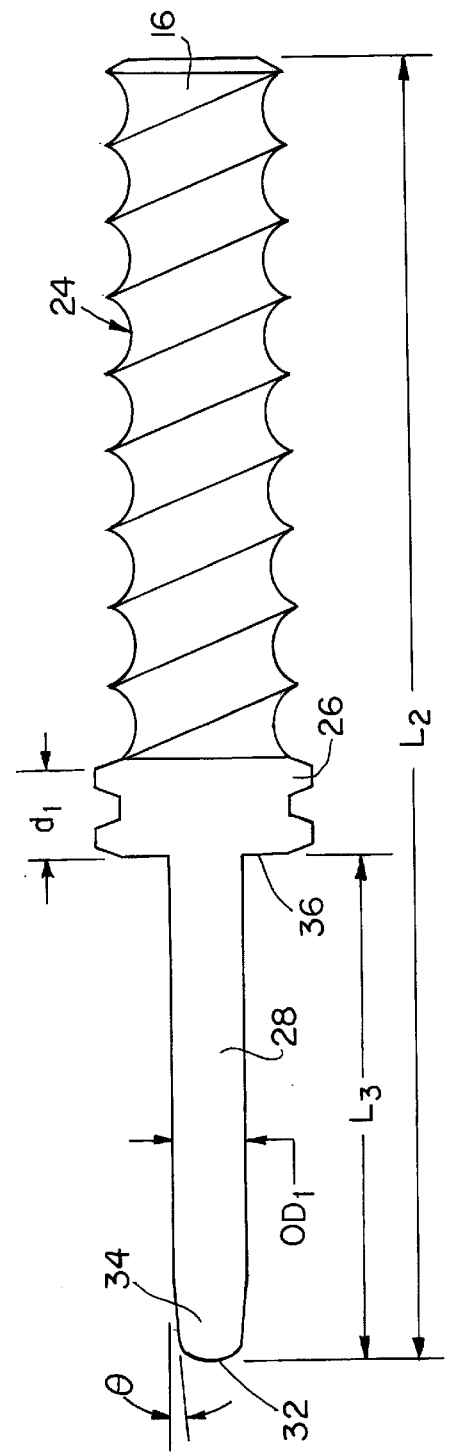
FIG. 3 is a side view of the coupling rod.

Referring to FIGS. 1, 2 and 3, multi-piece cue stick 10 has a lower stick portion 14 and an upper stick portion 12 joined together by coupling 11. Coupling 11 includes a sleeve bushing 18 and a coupling rod 16 which are coupled to stick portions 14 and 12 respectively.

Sleeve bushing 18 has a threaded region 20 and a smooth bore 38. Sleeve bushing 18 is coupled to stick portion 14 by screwing and gluing the sleeve bushing 18 into stick portion 14. Alternatively, sleeve bushing 18 and lower portion 14 can be coupled together by other suitable means. Coupling rod 16 has a smooth shaft region 28, a threaded region 26 and a threaded region 24. Coupling rod 16 is secured to stick portion 12 by screwing and gluing threaded region 24 into stick portion 12.

Stick portions 14 and 12 are coupled together by inserting shaft 28 of coupling rod 16 into bore 38 of sleeve bushing 18 and twisting coupling rod 16 so that threaded regions 26 and 30 engage each other. Shaft 28 and bore 38 are in a close slip fit with each other and locate stick portions 14 and 12 concentric with each other within 0.0005 inches when threaded regions 26 and 30 are engaged. This allows energy to be transferred from upper stick portion 12 to lower stick portion 14 efficiently so that a pool ball can be hit sharply with cue stick 10. Threaded regions 26 and 30 have a large lead angle and allow stick portions 14 and 12 to be coupled to each other between approximately ¼ to one revolution relative to each other. This permits the user of cue stick 10 to quickly assemble and disassemble cue stick 10 during a game. Furthermore, this makes it feasible to use cue sticks having more than two pieces in a game.

In a preferred embodiment, the external threaded region 20 of sleeve bushing 18 is a M12×1.75 3E4E type thread (FIG. 2). This provides sleeve bushing 18 with a large enough wall thickness to allow threaded region 30 to be a 0.360–11×0.160 inches deep stub acme thread. Inner diameter $ID_1$ of bore 38 is dimensioned to be in a slip fit with shaft 28 with a diameter of 0.2751 inches +0.0002/−0.0000. A chamfer 40 between threaded region 30 and bore 38 provides a smooth transition between threaded region 30 and bore 38. Chamfer 40 is 15°×0.060 inch chamfer. The length $L_1$ of sleeve bushing 18 is one inch. Additionally, the width $W_2$ of bushing head 22 is 0.130 inches wide while the diameter of bushing head 22 is 0.500 inches.

In a preferred embodiment, shaft 28 has an outer diameter $OD_1$ of 0.275 inches +0.000/−0.0002 (FIG. 3). The tip 34 of shaft 28 is angled at 5° for 0.250 inches and terminates at a radius 32. This allows shaft 28 to easily engage bore 38 of sleeve bushing 18 without damaging the parts. When coupling rod 16 engages sleeve bushing 18, shoulder 36 is tightened against shoulder 42. Shaft 28 has a length $L_3$ of one inch. Thread region 26 is a 0.360–11 stub acme-4G type thread which has a length $d_1$ of 0.180 inches. The stub acme thread allows up to ¼ to one full turn of engagement to tighten lower portion 14 to upper portion 12. Threaded region 24 has a diameter of 0.3125 inches +0.0005/−0.005 with a 0.156 full radius between the threads and a lead to a sharp point. The total length $L_2$ of coupling rod 16 is preferably four inches long.

The slip fit between shaft 28 and bore 38 is shown to be −0.0001 loose to 0.0005 loose which achieves a maximum concentricity of 0.0005 between lower portion 14 and upper portion 12. However, the diameter $OD_1$ of shaft 28 and the inner diameter $ID_1$ of bore 38 can be dimensioned to be within only 0.001 inches of concentricity.

Figure 4:
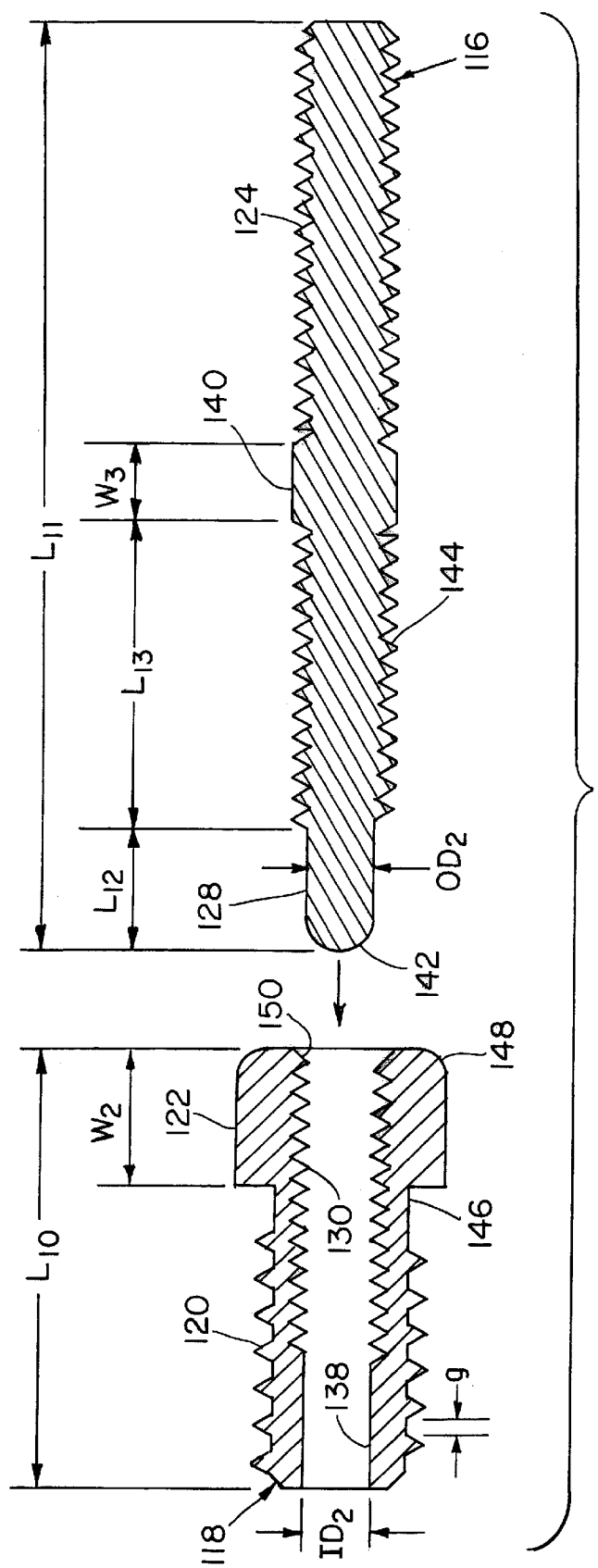
FIG. 4 is a sectional view of a sleeve bushing and a coupling rod of a preferred embodiment.

FIG. 4 depicts another preferred embodiment of the present invention in which a sleeve bushing 118 and a coupling rod 116 are used to couple stick portion 14 to stick portion 12. Sleeve bushing 118 is fastened to lower portion 14 by screwing threaded portion 120 into lower stick portion 14. Coupling rod 116 is secured to upper stick portion 12 by screwing and gluing threaded region 124 to upper stick portion 12.

In order to engage coupling rod 116 with sleeve bushing 118, shaft 128 is inserted into bore 138 and rotated to engage threaded region 144 with threaded region 130. The inner diameter $ID_2$ and outer diameter $OD_2$ are dimensioned relative to each other to provide a close slip fit so that lower portion 14 and upper portion 12 are concentric with each other.

In a preferred embodiment, bushing head 122 has a width $W_2$ of 0.110/0.115 inches and a radiused edge 148 of 0.020/0.025 inches. The inner diameter $ID_2$ of bore 138 is 0.1800/0.1803 inches. A 45° chamfer 150 allows threaded portion 144 to easily engage threaded region 130. Neck 146 is 0.373 +/−0.002 inches in diameter by 0.110 inches wide. Threaded region 120 is a 7/16–14×0.780 long thread which has an outer diameter of 0.436/0.430 inches and a pitch diameter of 0.389/0.384 inches. The gap "g" between the threads is 0.018/0.021 inches wide. The total length $L_{10}$ of sleeve bushing 118 is one inch. The threaded region 130 has a 0.310–12.3×0.800 inches deep thread with a pitch diameter of 0.2557/0.2562 inches and an inner diameter of 0.241/0.237 inches. The outer diameter of bushing head 122 is 0.481+0.000/−0.001 inches.

In a preferred embodiment, the outer diameter $OD_2$ of shaft 128 is 0.1800/0.1798 inches. Radius 142 allows the easy engagement of shaft 128 with bore 138. The length L12 of shaft 128 is 0.240/0.250 inches. Threaded region 144 is a 0.310–12.3 thread ×0.750 +/−0.005 inches long with a pitch diameter of 0.2555/0.2558 inches. Smooth portion 140 is a transition region separating threaded regions 124 and 144. Transition region 140 has a width $W_3$ of 0.250 inches. Threaded region 124 is a 5/16–14 thread having a outer diameter of 0.310/0.306 inches and a pitch diameter of 0.264/0.261 inches.

Figure 5:
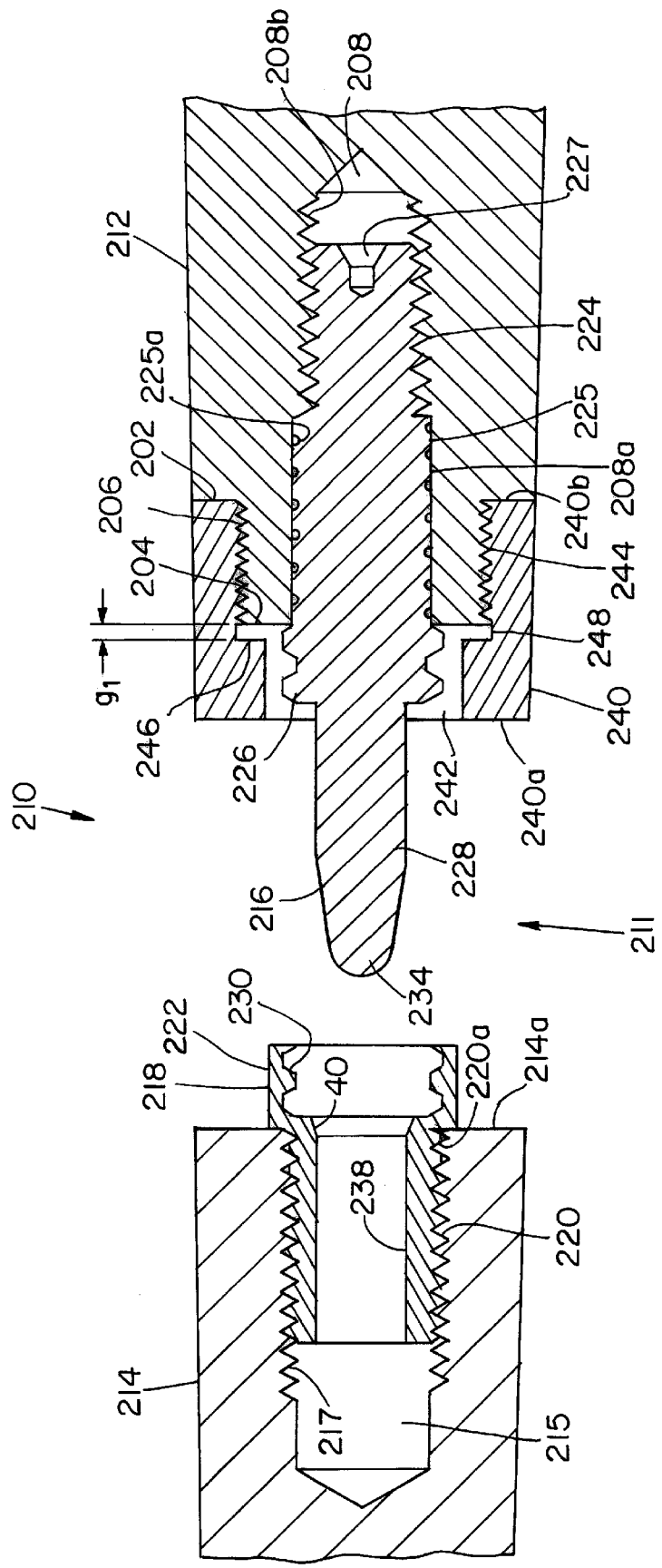
FIG. 5 is a side sectional view of another preferred embodiment of the present invention.

FIG. 5 depicts another preferred embodiment of the present invention. Multi-piece cue stick 210 has a lower stick portion 214 and an upper stick portion 212 which are capable of being joined together by a coupling 211. Coupling 211 includes a sleeve bushing 218 and coupling rod 216 which are attached to stick portions 214 and 212 respectively. Coupling rod 216 has a shaft 228 and a threaded region 226 for engaging an internal smooth bore 238 and an internal threaded region 230 within sleeve bushing 218. Coupling 211 also includes a tapered collar 240 fastened to the end of upper stick portion 212 for surrounding and protecting the threads 226 of coupling rod 216.

Stick portions 212 and 214 are coupled together by inserting shaft 228 of coupling rod 216 into bore 238 of sleeve bushing 218 until threaded region 226 reaches bushing head 222 of sleeve bushing 218. Stick portions 212 and 214 are then rotated relative to each other so that threaded region 226 engages threaded region 230. The stick portions 212 and 214 are rotated for about one revolution until end 240a of collar 240 is tightened against end 214a of stick portion 214. Shaft 228 locates stick portions 212 and 214 concentric with each other so that any runout in the threaded regions 226 and 230 does not affect the concentricity of stick portions 212 and 214.

Sleeve bushing 218 has an external threaded region 220 which allows sleeve bushing 218 to be secured to lower stick portion 214 by screwing and gluing sleeve bushing 218 into threaded hole 217 until bushing head 222 abuts end 214a of lower stick portion 214. Hole 217 is drilled deeper than the length of threaded region 220 in order to form a cavity 215 beyond sleeve bushing 218. Cavity 215 receives air displaced by shaft 228 of coupling rod 216 when stick portions 212 and 214 are coupled together. It is of sufficient volume to prevent excessive pressure buildup which would interfere with coupling of the stick portion.

Sleeve bushing 218 is similar to sleeve bushing 18 but differs mainly in that the dimensions are slightly different. Sleeve bushing 218 is 0.985 inches long. Threaded region 220 has an M-12×1.75 modified thread in which the major diameter is preferably 0.463 inches and the pitch diameter is 0.419/0.420 inches. Bushing head 222 is 0.130 inches wide and is 0.490+0.001/−0.000 inches in diameter. Threaded region 230 is an 11 pitch thread 0.180 inches long with a major diameter of 0.371+0.003/−0.000 inches and a minor diameter of 0.313+0.003/−0.000 inches. Alternatively, other suitable pitches can be used such as a 9 pitch or a 10 pitch. Bore 238 is preferably 0.2797 +0.0002/−0.0000 inches in diameter. Neck 220a is 0.125 inches wide and is 0.426 inches in diameter. Sleeve bushing 218 is preferably made of brass.

Coupling rod 216 is secured to upper stick portion 212 by screwing and gluing threaded region 224 into the threaded region 208b of hole 208. Diameter 225 fits within and is glued to the smooth region 208a of hole 208 which centers coupling rod 216 concentrically within upper stick portion 212. Coupling rod 216 is screwed into hole 208 until threaded region 226 abuts against end 204 of upper stick portion 212.

Coupling rod 216 is similar to coupling rod 16 but differs mainly in that coupling rod 216 has a smooth diameter 225 between threaded regions 226 and 224. Additionally, the dimensions of coupling rod 216 are slightly different then those of coupling rod 16. The length of coupling rod 216 is preferably 3.3750 inches. Diameter 225 has a spiral groove 225a into which glue can seep. This forms a strong bond between diameter 225 and the smooth-region 208a of hole 208. Groove 225a has ten threads per inch and is 0.005 to 0.008 inches deep. Diameter 225 preferably has a 125 micro-inch finish, is 1.125 inches long and has a diameter of 0.313+0.0000/−0.0005 inches. Threaded region 224 is 1.410 inches long and has a 5/16–14 modified thread with a major diameter of 0.304/0.300 inches and a pitch diameter of 0.257/0.254 inches. Tapered hole 227 provides a center for turning coupling rod 216 as well as a starter hole for drilling out the interior of coupling rod 216 to lighten the weight of coupling rod 216.

Threaded region 226 is preferably 0.218 inches long with a single lead thread. Threaded region 226 is an 11 pitch thread with a major diameter of 0.369+000/−0.002 inches and a minor diameter of 0.311+0.000/−0.002 inches. The short length of threaded region 226 provides a quick lead thread which ends in about 1¾ revolutions. Alternatively, the length of the single thread in threaded region 226 can range from ¼ to no more than 2 revolutions. Threaded region 226 is dimensioned such that there is limited clearance between threaded region 226 of coupling rod 216 and threaded region 230 of sleeve bushing 218. The minor diameter of the threaded region 226 preferably rides on the major diameter of threaded region 230. This helps keep the coupling rod 216 and the sleeve bushing 218 to be concentric with each other. Threaded region 226 preferably has a thread form which does not easily cross thread such as a thread with a truncated root and crest. This includes stub acme-type threads or buttress threads. Alternatively, threaded region 226 can have a sharp vee thread or can have other suitable pitches such as a 9 pitch or a 10 pitch.

Shaft 228 is 0.970 inches long and is 0.2789+0.0000/ 0.0002 inches in diameter. The length of shaft 228 is at least about three times its diameter. This provides a clearance between shaft 228 and bore 238 of sleeve bushing 218 ranging from 0.0012 inches loose to 0.0008 inches loose. However, alternatively, the clearance between shaft 228 and bore 238 can be made to be as little as about 0.0005 inches or as large as about 0.002 inches. Additionally, for low cost sticks, the clearance can be made to be as large as 0.010 inches when the concentricity between stick portions 212 and 214 does not need to be precise. Tip 234 has a 5° angle which is ¼ inches long and ends in a 0.125 inch radius. The 5° angle on tip 234 allows an assembled upper stick portion 212 to be turned between centers with a reverse center holding tip 234 so that upper stick portion can be sanded or subjected to other operations. The 5° angle and 0.125 inch radius on tip 234 also allows tip 234 to sustain damaged on those surfaces (such as if upper stick portion 212 is dropped) without affecting the fit between shaft 228 and bore 238 of sleeve bushing 218. This is due to the fact that the surfaces of the 5° angle and 0.125 inch radius are not in a sliding fit with bore 238. In the preferred embodiment, coupling rod 216 is made of stainless steel and shaft 228 is given a hard coat which allows shaft 228 to slide easily within bore 238 of sleeve bushing 218. Alternatively, shaft 228 can be given a textured finish by cutting shaft 228 at a high feed rate or other suitable means such as grinding, rolling or sandblasting.

Tapered collar 240 is secured to upper stick portion 212 concentric with coupling rod 216 by respective threaded regions 244 and 206 of collar 240 and upper stick portion 212. Collar 240 is screwed onto upper stick portion 212 until collar 240 abuts against shoulder 202. Glue is applied to threaded regions 244 and 206 to prevent collar 240 from loosening. Collar 240 extends beyond and surrounds threaded region 226 of coupling rod 216 to protect threaded region 226. The short length of threaded region 226 allows threaded region 226 to be completely inside cavity 242 of collar 240.

The number of revolutions required to engage and disengage stick portions 212 and 214 can be controlled by controlling the gap $g_1$ between shoulder 246 of collar 240 and end 204 of upper stick portion 212. Gap $g_1$ can be varied by varying the distance between shoulder 202 and end 204. Controlling the gap $g_1$ allows end 240a to be axially positioned relative to threaded region 226 so that sleeve bushing 218 does not engage the full length of threaded region 226. In this manner, the number of turns required to engage and disengage stick portions 212 and 214 can be controlled or varied. Typically, gap $g_1$ is set so that stick portions 212 and 214 engage and disengage in about one revolution. However, gap $g_1$ can be set so that stick portions 212 and 214 engage and disengage in less than one revolution such as ¼ of a revolution. Additionally, if the length of threaded regions 226 and 230 are sized accordingly, stick portions 212 and 214 can be made to engage and disengage in two revolutions, however, having two revolutions is considered unnecessary and undesirable. The preferable number of revolutions is no more than about one revolution.

The outer diameter of collar 240 preferably tapers from 0.852+0.000/−0.001 inches at end 240b to 0.842+000/0.001 inches at end 240a. The length of collar 240 is 0.995 +0.002/−0.000 inches. Collar 240 has a threaded region 244 having a 5/8–18 modified thread 0.58 inches deep. The pitch diameter of threaded region 244 is 0.6225/−0.6255 inches and the minor diameter is 0.596/0.599 inches. Internal Diameter 248 is 0.5952+0.0002/−0.0000 inches. Shoulder 246 is 0.775+0.002/−0.000 inches away from surface 240b. Cavity 242 is 0.495+0.002/−0.000 inches in diameter. Collar 240 is preferably made from stainless steel.

Figure 6:
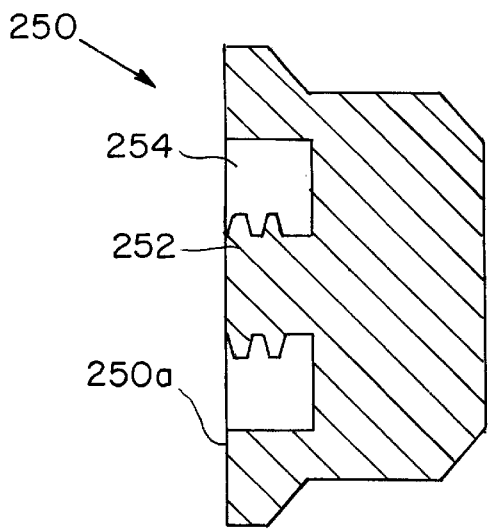
FIG. 6 is a side sectional view of a joint protector for protecting the sleeve bushing.

Referring to FIG. 6, joint protector 250 can be coupled to sleeve bushing 218 to protect sleeve bushing 218 against damage when multi-piece cue stick 210 is disassembled. Joint protector 250 has a threaded region 252 which mates with threaded region 230 on sleeve bushing 218 so that joint protector 250 can be screwed to sleeve bushing 218. Bushing head 222 fits within recess 254 and is completely protected. Joint protector 250 is tightened until surface 250a abuts against end 214a of stick portion 214.

Figure 7:
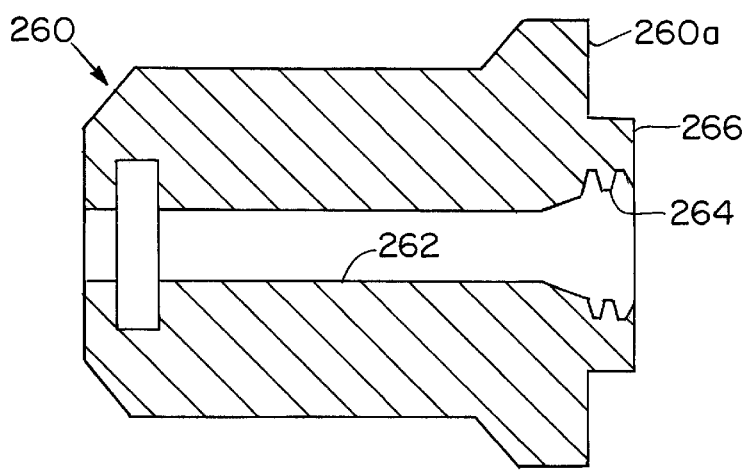
FIG. 7 is a side sectional view of a joint protector for protecting the coupling rod.

Referring to FIG. 7, joint protector 260 can be coupled to coupling rod 216 to protect shaft 228. Joint protector 260 has a threaded region 264 which mates with threaded region 226 of coupling rod 216 and has a bore 262 for accepting shaft 228. Hub 266 extends within cavity 242 so that surface 260a can be tightened against end 240a of collar 240. Joint protectors 250 and 260 are preferably made out of delrin but alternatively, can be made of other suitable materials such as nylon, aluminum, brass, wood, etc.

Figure 8:
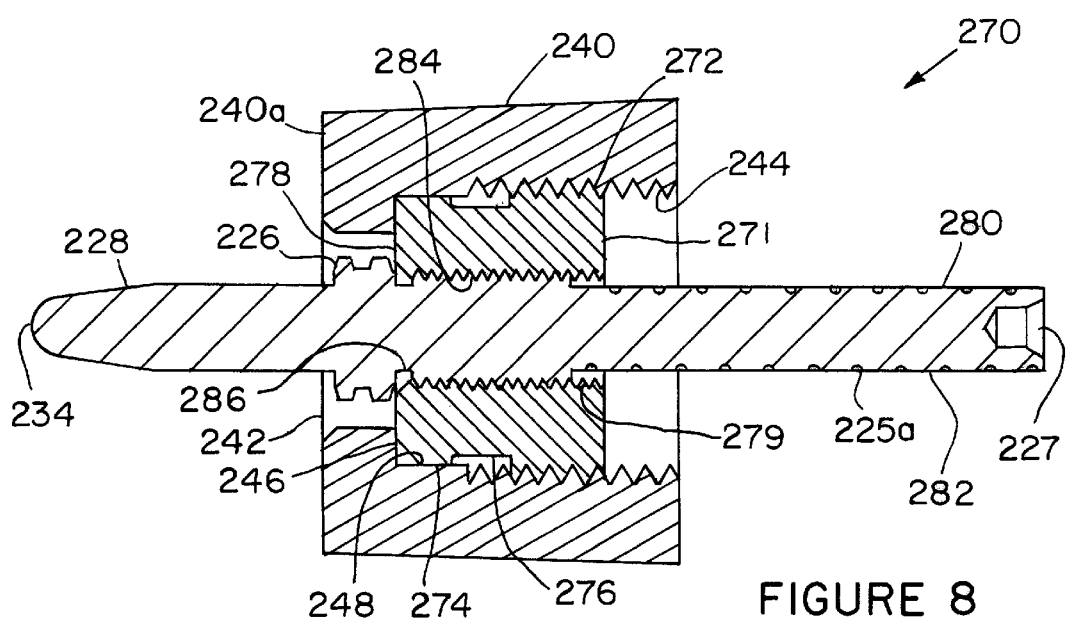
FIG. 8 is a side sectional view of a coupling rod/collar assembly.

FIG. 8 depicts another preferred embodiment of the present invention. Coupling rod/collar assembly 270 is preassembled before being secured to upper stick portion 212. Coupling rod/collar assembly 270 includes a coupling rod 280, a collar 240 and an adapter 271. Coupling rod 280 and adapter 271 are coupled together via respective threaded regions 284 and 279. Glue is applied to threaded regions 284 and 279 to prevent disassembly. Adapter 271 and collar 240 are coupled together via respective threaded regions 272 and 244. Glue is also applied to threaded regions 272 and 244. Adapter 271 is screwed within collar 240 until end 278 abuts shoulder 246. Diameter 274 of adapter 271 mates with diameter 248 of collar 240 to align adapter 271 concentrically within collar 240. In the preferred embodiment, adapter 271 is preferably made of phenolic but alternatively, can be made of other suitable plastics such as nylon, aluminum, brass, wood, steel, etc.

Coupling rod 280 differs from coupling rod 216 mainly in that threaded region 284 is located between threaded region 226 and smooth diameter 282. Threaded region 284 is a 0.350–142A thread that is 0.375 inches long. A neck 286 separates threaded region 284 from threaded region 226. Diameter 282 is 0.272+0.0005/−0.0000 inches in diameter and is 2.160 inches long.

Coupling rod/collar assembly 270 is secured to upper stick portion 212 by inserting and gluing diameter 282 into a hole within upper stick portion 212. Collar 240 is screwed and glued onto a threaded diameter located at the end of upper stick portion 212. Coupling rod/collar assembly 270 reduces the amount of labor required for assembling upper stick portion 212 and, therefore, increases production.

Although specific dimensions have been given for collar 240, sleeve bushings 18, 118 and 218, and coupling rods 16, 116, 216 and 280, those dimensions are merely examples and can be varied accordingly to accommodate different applications. Additionally, the specified tolerances and thread types can be varied. The materials for collar 240, sleeve bushings 18, 118 and 218 and coupling rods 16, 116, 216 and 280, joint protectors 250 and 260, and adapter 271 can be made from any suitable materials such as brass, aluminum, titanium, bronze, plastic, silver and gold as well as iron, steel or stainless steel. Sleeve bushings 18, 118 and 218 can be coated with Teflon™ while the coupling rods 16, 116, 216 and 280 are coated with a hard coat or a metallic plating. This insures that the sleeve bushings 18, 118 and 218 and the coupling rods 16, 116, 216 and 280 do not wear out quickly or become easily scratched. Sleeve bushings 18, 118 and 218 and coupling rods 16, 116, 216 and 280 can be machined between centers on a lathe. Furthermore, stick portions 12 and 14 can have a flat machined on them so that a logo can be put on the flat. A laser can be used to mark stick portions 12 and 14.

Equivalents

While this invention has been particularly shown and described with references to preferred embodiments thereof, it will be understood by those skilled in the art that various changes in form and details may be made therein without departing from the spirit and scope of the invention as defined by the appended claims.

For example, a prior art coupling having a coupling rod with a long threaded portion can be modified to provide a coupling similar to that depicted in the figures. This is accomplished by turning down the threaded portion of the male coupling rod leaving a length of thread having only 1 or 2 turns of thread. The turned down portion of the coupling rod serves as a guide into the threaded sleeve. Such a coupling would have quick coupling capabilities but would not hold two cue stick portions together in as precise concentricity as when the sleeve has a smooth bore to accept a smooth elongate tip of the coupling rod. Other methods of modifying the prior art coupling includes cutting the male coupling rod to leave only 1 or 2 turns of thread or drilling out the threads in the threaded sleeve to leave 1 or 2 turns of thread.

What is claimed is:

1. A cue stick comprising:
   a first stick portion secured to a first coupling member, the first coupling member having only one internal threaded region, the entire only one internal threaded region having only a single uninterrupted constant diameter thread; and
   a second stick portion secured to a second coupling member, the second coupling member having a first external threaded region, the entire first external threaded region having only a single uninterrupted constant diameter thread, the first external threaded region engages the internal threaded region of the first coupling member for coupling the second coupling member to the first coupling member, the first and second coupling members being firmly securable together within approximately one revolution of the second coupling member, one of the coupling members having a smooth inner diameter portion and the other of the coupling members having a smooth elongate tip, the smooth elongate tip having a close fit with the smooth inner diameter.

2. The cue stick of claim 1 in which the first coupling member has an external threaded region for coupling the first coupling member to the first stick portion.

3. The cue stick of claim 2 in which the second coupling member has a second external threaded region for coupling the second coupling member to the second stick portion.

4. The cue stick of claim 3 in which the second coupling member has a region with a smooth diameter adjacent to the second external threaded region.

5. The cue stick of claim 4 in which the second coupling member has a groove on the smooth diameter.

6. The cue stick of claim 1 in which the internal threaded region of the first coupling member and the first external threaded region of the second coupling member have truncated threads.

7. The cue stick of claim 1 further comprising a collar coupled to the second stick portion concentric with the second coupling member for surrounding and protecting the first external threaded region of the second coupling member.

8. The cue stick of claim 7 in which the position of the collar relative to the first external threaded region of the second coupling member determines the number of revolutions in which the second coupling member and the first coupling member can be coupled together.

9. The cue stick of claim 1 in which the first coupling member has the smooth inner diameter portion and the second coupling member has the smooth elongate tip which has a close fit with the smooth inner diameter of the first coupling member, the clearance between the smooth inner diameter portion of the first coupling member and the smooth elongate tip of the second coupling member is less than about 0.002 inches.

10. The cue stick of claim 9 in which the tip of the second coupling member terminates at a radius.

11. The cue stick of claim 9 in which the tip of the second coupling member has a 5° angle for about 0.250 inches.

12. A coupler for a cue stick comprising:
    a first coupling member adapted for securing to a first stick portion, the first coupling member having only one internal threaded region, the entire only one internal threaded region having only a single uninterrupted constant diameter thread; and
    a second coupling member adapted for securing to a second stick portion, the second coupling member having a first external threaded region, the entire first external threaded region having only a single uninterrupted constant diameter thread, the first external threaded region engages the internal threaded region of the first coupling member for coupling the second coupling member to the first coupling member, the first and second coupling members being firmly securable together within approximately one revolution of the second coupling member, one of the coupling members having a smooth inner diameter portion and the other of the coupling members having a smooth elongate tip, the smooth elongate tip having a close fit with the smooth inner diameter.

13. The coupler of claim 12 further comprising a collar surrounding the first external threaded region.

14. The coupler of claim 13 in which the collar protects the first external threaded region of the second coupling member.

15. A coupler for a sports stick comprising:

a first coupling member adapted for securing to a first sports stick portion, the first coupling member including only one internal threaded region, the entire only one internal threaded region having only a single uninterrupted constant diameter thread; and a second coupling member adapted for securing to a second sports stick portion, the second coupling member including a first external threaded region, the entire first external threaded region having only a single uninterrupted constant diameter thread, the first external threaded region engaging the internal threaded region of the first coupling member for coupling the second coupling member to the first coupling member, the first and second coupling members being firmly securable together within approximately one revolution, one of the coupling members having a smooth inner diameter portion and the other of the coupling members having a smooth elongate tip, the smooth elongate tip having a close fit with the smooth inner diameter.

\* \* \* \* \*